United States Patent [19]
Grant

[11] 3,961,310
[45] June 1, 1976

[54] VEHICLE ANTI-TAMPERING ANTI-THEFT PROTECTION SYSTEM

[76] Inventor: Daniel E. Grant, 3229 Yorkshire Road, Cleveland Heights, Ohio 44118

[22] Filed: June 28, 1974

[21] Appl. No.: 484,276

Related U.S. Application Data

[63] Continuation-in-part of Ser. No. 355,881, April 30, 1973, abandoned.

[52] U.S. Cl. ............................. 340/65; 340/64; 307/10 AT; 180/114
[51] Int. Cl.² .................. B60R 25/04; B60R 24/10
[58] Field of Search ................... 340/63, 64, 65; 307/10 AT; 180/114; 200/44; 70/243

[56] References Cited
UNITED STATES PATENTS

| | | | |
|---|---|---|---|
| 1,747,194 | 2/1930 | Thomas | 340/65 |
| 3,304,380 | 2/1967 | Mitchell | 200/44 |
| 3,317,904 | 5/1967 | Clay | 200/44 |
| 3,358,481 | 12/1967 | Roszkowski | 307/10 AT |
| 3,522,394 | 7/1970 | Bellrose | 200/44 |
| 3,687,216 | 8/1972 | Tracy | 180/114 |
| 3,714,628 | 1/1973 | Sloger | 340/64 |
| 3,720,284 | 3/1973 | Myers | 340/64 |
| 3,756,341 | 9/1973 | Tonkowich et al. | 180/114 |
| 3,834,484 | 9/1974 | Sangster | 180/114 |

*Primary Examiner*—John W. Caldwell
*Assistant Examiner*—Joseph E. Nowicki
*Attorney, Agent, or Firm*—David A. Burge Co.

[57] ABSTRACT

A theft protection and alarm system for vehicles including a latching solenoid fuel cutoff valve, and a vibration and motion sensitive switch together with door, trunk and hood switches for actuating an audible alram. The alarm system is turned on and off by a novel key-operated switch. Conductors carried in electrical cables extending between the major components of the system normally energize a relay to maintain its contacts open. If one or more of the cables is cut, the contacts close sounding the alarm.

11 Claims, 3 Drawing Figures

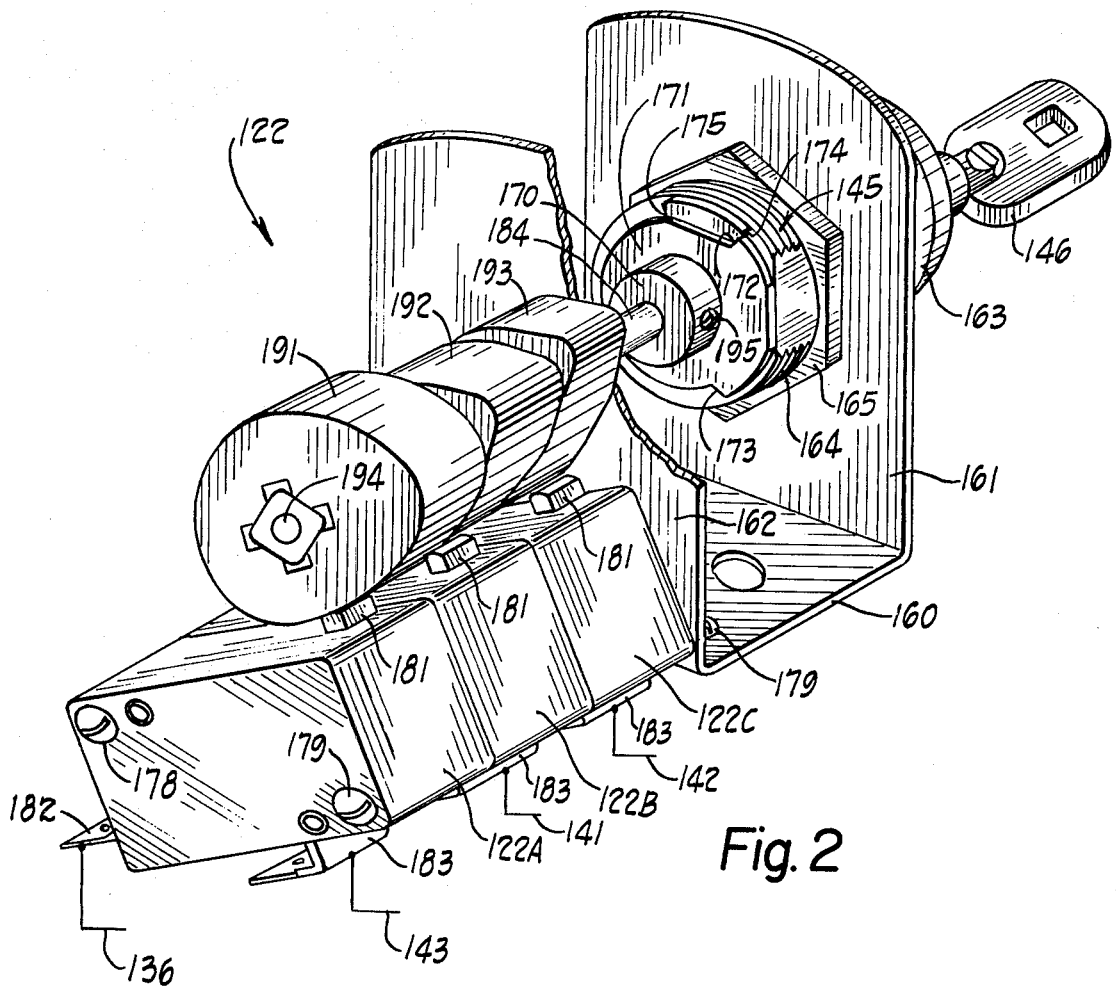
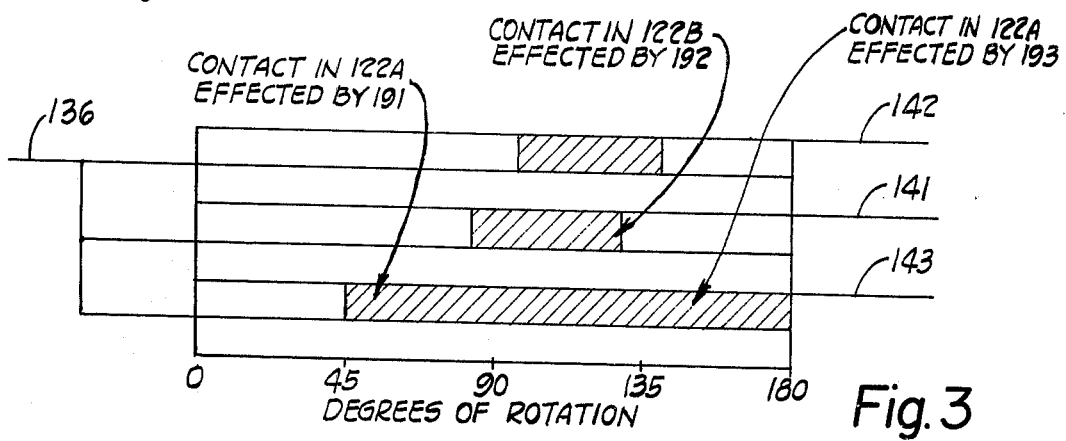
Fig. 2
Fig. 3

VEHICLE ANTI-TAMPERING ANTI-THEFT PROTECTION SYSTEM

CROSS REFERENCE TO RELATED APPLICATION

The present application is a continuation-in-part of copending application Ser. No. 355,881, filed Apr. 30, 1973, now abandoned, the disclosure of which is incorporated by reference.

BACKGROUND OF THE INVENTION

1. Field of the Invention

The present invention relates generally to a theft protection and alarm system for vehicles.

2. Prior Art

The following two relevant prior patents are referenced:

1. Automobile Theft Alarm, U.S. Pat. No. 2,885,504 issued May 5, 1959 to Joseph G. Yurtz.
2. Motion Sensitive Alarm System, U.S. Pat. No. 3,725,890 issued Apr. 3, 1973 to John C Cirino.

Many types of alarm systems have been proposed for use in preventing or deterring the theft of automobiles. Despite the use of automobile anti-theft systems, the number of automobile thefts has continued to climb steadily.

One problem with some known alarm systems is that they rely solely on the actions of bystanders to stop a theft which is in progress. One type of these known systems uses highly sensitive vibration and motion responsive switches. Such a switch energizes an audible signal such as a horn or siren when the car is being tampered with or driven away by an unauthorized person. Since the alarm does nothing to disable operation of the automobile, it relies on bystanders to stop the thieves or contact police. Often times, bystanders decline to become involved and ignore the audible alarm. Even when they do call police, the car has often times been driven away by the thieves before police arrive on the scene.

A number of proposals have also been made for protective systems which cut off the supply of fuel, or brake fluid or the like, to disable a vehicle. Such proposed systems have not included the feature of a vibration and motion sensitive alarm for attracting attention to the thieves.

Still another problem with proposed protective and alarm systems is their susceptibility to tampering. Most known systems can readily be bypassed by cutting cables leading to the essential operational components. Some systems require some additional minor rewiring in order to fully bypass their operation, but they do nothing to attract attention to the thieves while the requisite rewiring is being carried out.

SUMMARY OF THE INVENTION

The present invention overcomes the foregoing and other drawbacks of the prior art and provides a novel and improved theft prevention system for vehicles.

A solenoid operated valve located in a relatively inaccessible position on the vehicle is provided to selectively cut off the supply of fuel from the fuel tank to the engine. The valve is preferably of the latching solenoid type. The latching nature of the valve eliminates the necessity for constantly energizing the valve either when the vehicle is being driven and the alarm system is off, or when the vehicle is parked and the alarm system is on. A momentary energization of two selected terminals of the valve is operative to open the valve and latch it in the open position. A momentary energization of two other selected terminals on the valve is operative to close the valve and latch it in the closed position.

The latching nature of the valve greatly complicates a thief's efforts to bypass the alarm system by cutting the electrical cable to the valve and rewiring the system. Cutting the cable will not energize the valve to open it. Rewiring is complicated by the fact that if current is supplied momentarily to the wrong selected conductors, the valve will not open but will remain closed. Exactly the right terminals must be energized. Striking the valve with a heavy object, or vibrating the valve, will not cause the valve to alter its latched (open or closed) position. Only proper electrical energization will alter the valve plunger position.

In the preferred embodiment, the present invention utilizes a vibration and motion sensitive switch of a known type to energize an audible alarm in response to vibration or movement of the vehicle. Trunk, hood and door switches are connected in parallel with the vibration sensitive switch to energize the audible alarm if the trunk, hood or passenger doors are opened. The vibration sensitive and closure operated switches provide additional tamper protection for the fuel cutoff valve.

An optional feature of the present invention is the provision of a tamper sensitive system operative to sound the audible alarm if the electrical cable to any of the major alarm system components are severed. The cables include alarm conductors coupled in electrical series with an energized-open relay. The alarm conductors normally maintain the relay energized to prevent its switch contacts from closing. If the cables are severed the relay is de-energized and its contacts close, sounding the alarm.

A key operated switch is provided for selectively enabling or disabling the alarm system. In the preferred embodiment, the key operated switch includes a plurality of rotatable cams which turn with a switch cylinder when a proper key is inserted in the switch. In the "alarm on" position, the cams cause a first set of contacts to render the vibration sensitive switch and the door, trunk and hood switches operable. In moving to and from the "alarm on" position, the cams momentarily close second and third sets of contacts to selectively open or close the fuel valve, whereafter the valve latches in its desired position.

The key-operated switch is preferably located in a hidden position. The fuel cut-off valve is preferably located at an inaccessible position to complicate efforts to tamper with it.

While the alarm system of the present invention utilizes a number of known components, it combines them to provide a highly tamper resistant system which prevents a vehicle from being driven any substantial distance by thieves and which will issue an attention attracting alarm during all stages of the efforts to steal the vehicle.

It is a general object of the present invention to provide a novel and improved anti-theft system for vehicles.

Other objects and a fuller understanding of the invention may be had by referring to the following description and claims taken in conjunction with the accompanying drawings.

BRIEF DESCRIPTION OF THE DRAWINGS

FIG. 2 is an enlarged perspective view of a key-operated switch used in the preferred embodiment of the invention; and, FIG. 3 is a schematic illustration of the operation of the switch shown in FIG. 2.

DESCRIPTION OF THE PREFERRED EMBODIMENT

Figure 1:
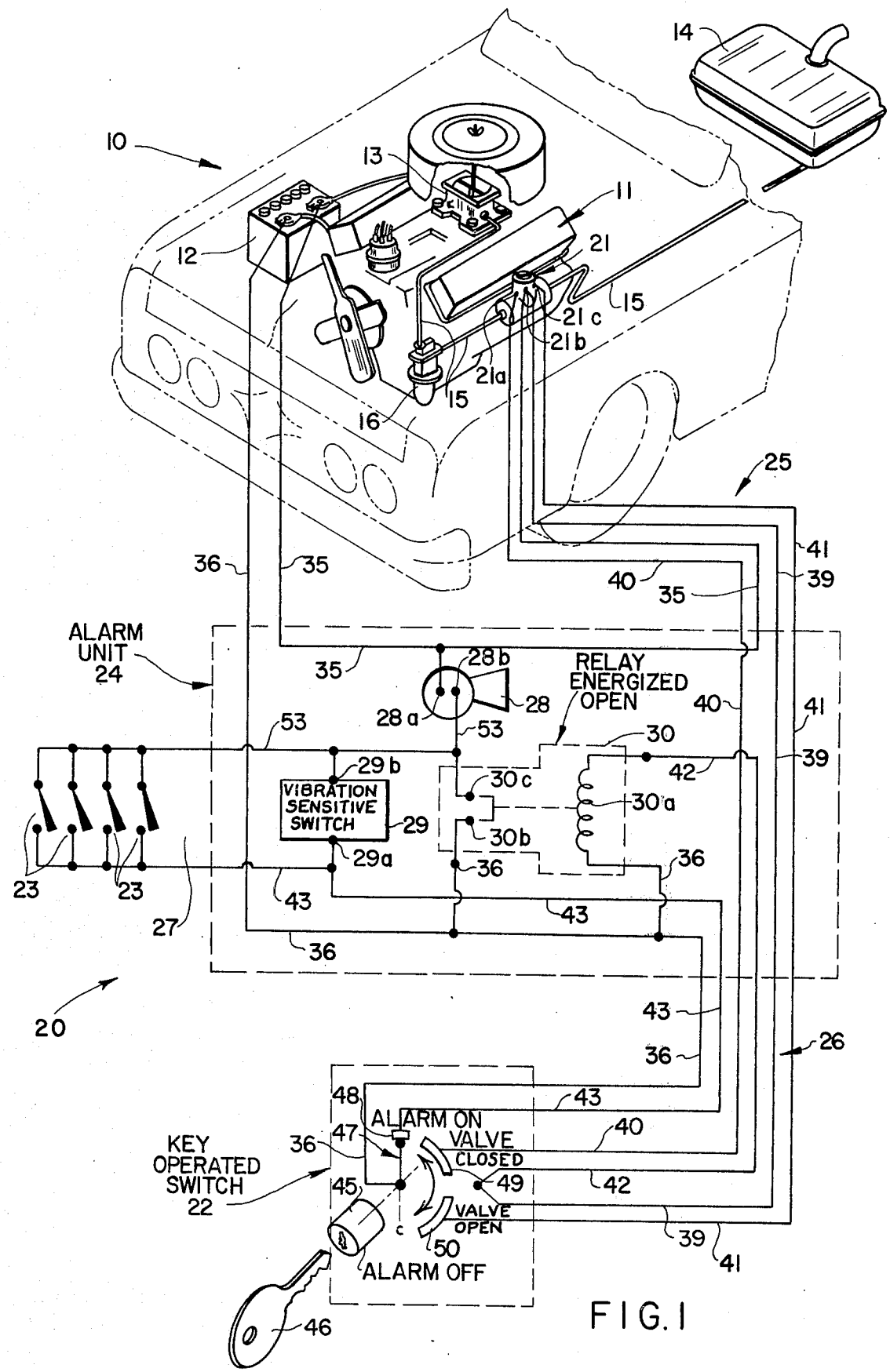
FIG. 1 is a schematic illustration of an alarm system constructed in accordance with the present invention and installed in a conventional automobile.

Referring to FIG. 1, a conventional automobile is indicated generally by the numeral 10. The automobile 10 includes, an internal combustion engine 11 equipped with a storage battery 12. A carburetor 13 is provided for supplying fuel to the engine 11. Fuel is supplied to the carburetor 13 from a fuel reservoir tank 14 through a fuel line 15. A fuel pump 16 is interposed in the fuel line 15 to effect the supply of fuel under positive pressure to the carburetor 13.

The automobile 10 is provided with an alarm system, indicated generally by the numeral 20. The alarm system 20 includes a solenoid valve 21 interposed in the fuel line 15, a key operated switch 22, a plurality of door, hood and trunk operated switches 23, and an alarm unit 24. A four-conductor cable 25 interconnects the solenoid valve 21 and the alarm unit 24. A six-conductor cable 26 interconnects the key operated switch 22 and the alarm unit 24. A two-conductor cable 27 interconnects the switches 23 and the alarm unit 24.

The alarm system 20 is electrically powered and may operate from the battery 12 or from a separate battery (not shown). In the embodiment of FIG. 1, a pair of line conductors 35, 36 are shown connected to the battery 12 for supplying power to the alarm unit 24.

The alarm unit 24 includes several operational components which are preferably mounted within a metallic housing to discourage tampering. The alarm unit housing may be mounted within the engine compartment of the automobile, or within the passenger compartment or the trunk, as desired. The preferred mounting position is within the engine compartment in a location which is sufficiently inaccessible to further discourage tampering.

One of the alarm unit components is a siren 28 or other electrically operated audible alarm device which, when energized, will attract attention to the automobile. A pair of electrical terminals 28a, 28b are provided on the siren 28 which, when connected to a power source, will sound the siren 28. Two other alarm unit components include a vibration sensitive switch 29 and a relay 30, both of which are operative under conditions which will be described to energize the siren 28.

The vibration sensitive switch 29 is preferably of the type described in either of the referenced patents and serves to establish electrical connection between terminals 29a, 29b in response to sensed movement of the vehicle. This switch is sensitive to elevation of the vehicle and will sound the alarm if the vehicle is raised for towing or to remove wheels, etc. The relay 30 includes a coil 30a which, when connected across a power source, is operative to open a pair of contacts 30b, 30c. When the relay coil 30a is de-energized, the contacts 30b, 30c are normally closed.

The line conductor 35 connects with one terminal 28a of the siren 28 and additionally comprises one of the conductors in the cable 25 connecting with the solenoid valve 21. The line conductor 36 connects with one end of the relay coil 30a, with the relay contact 30b, and forms one of the conductors in the cable 26 connecting with the key operated switch 22.

The solenoid valve is preferably installed in the fuel line at a position which is sufficiently inaccessible to discourage tampering. The solenoid valve 21 is of the latching type and is provided with three electrical terminals 21a, 21b, 21c. When a suitable potential is momentarily supplied to the terminals 21a, 21b, the solenoid valve 21 will close and will latch in its closed position. When, a suitable potential is momentarily supplied to the terminals 21c, 21b, the solenoid valve 21 will open and will latch in its open position. One such solenoid valve is commercially sold by the Skinner Electric Valve Division, Skinner Precision Instruments, Inc., New Britain, Conn.

The line conductor 35 connects with the terminal 21b. Three other conductors 39, 40, 41 comprising the remaining three conductors in the cable 25 connect respectively with the terminals 21b, 21a, 21c. The conductors 39, 40, 41 feed through the alarm unit 24 without connecting to any of the components therein, and form three of the conductors in the cable 26 connecting with the key operated switch 22.

The key operated switch 22 is preferably mounted at a hidden location which is sufficiently inaccessible to discourage tampering but which will also permit it to be operated by a key 46 from outside the automobile. A preferred location is on the right front fender of the automobile. In one embodiment, the switch 22 includes a pin tumbler cylinder 45 which is operable when the key 46 is inserted to rotate a movable contact 47 along a semicircular path between an "alarm on" position and an "alarm off" position. When the contact 47 is in its "alarm on" position, it makes electrical contact with a fixed contact 48. In moving between the "alarm on" and "alarm off" positions, the contact 47 makes momentary contact one at a time with fixed contacts 49, 50. The lock cylinder 45 is conventional in that the key 46 can be removed only when the contact 47 is in the "alarm on" and the "alarm off" positions. An alternate and preferred embodiment of the key operated switch shown in FIG. 2 will be described.

The conductors 40, 41 connect respectively with the fixed contacts 49, 50. The conductor 39 connects at a position internally of the switch 22 with a conductor 42. A conductor 43 connects with the switch contact 48. The conductors 42, 43 form the remaining two conductors in the cable 26 connecting with the alarm unit 24.

Within the alarm unit 24, the conductor 42 connects to the relay coil 30a. The conductor 43 connects with the vibration sensitive switch contact 29a. A conductor 53 is provided for interconnecting the relay contact 30a and the vibration sensitive switch contact 29b with the siren terminal 28b.

The switches 23 are electrically connected in parallel between the conductors 43, 53. The switches 23 are positioned at appropriate tamper-proof locations within the automobile and close in response to the opening of the vehicle doors, trunk and hood to complete electrical connection between the conductors 43, 53.

When the owner of the automobile is ready to drive the automobile, he inserts the key 46 into the lock cylinder 45 and rotates the contact 47 to the alarm off position. When the contact 47 leaves the alarm on position, it disengages the contact 48 thereby disconnecting the conductor 43 from the line conductor 36 to de-energize the alarm unit 24. Just prior to reaching the alarm off position, the contact 47 makes momentary contact with the contact 50, thereby momentarily connecting the line conductor 36 to the conductor 41. The momentary contact energizes the latching solenoid valve 21 to the valve open position where it latches. The automobile can then be entered and driven without energizing the siren 28. Energization of the alarm system is accomplished by inserting the key 46 into the cylinder 45 and rotating the contact 47 to the alarm on position. Prior to reaching the alarm on position, the contact 47 makes momentary contact with the contact 49, momentarily connecting the line conductor 36 to the conductor 40. This momentary contact energizes the solenoid 21 to the "valve closed" position where it latches. With the valve 21 closed, no fuel will be supplied from the tank 14 to the engine 11, and the automobile can only be driven a short distance.

When the contact 47 reaches the alarm on position, it engages the contact 48 connecting the line conductor 36 with the alarm unit power conductor 43. Once the conductor 43 is energized, the siren 28 will be sounded in response to the closing of any of the switches 23 or in response to closing of the vibration and movement sensitive switch 29, or in response to de-energization of the relay 30.

The relay 30 together with the conductors 39, 42 constitute a tamper-sensitive system which will sound the siren 28 if either of the cables 25, 26 are severed, regardless of whether the key operated switch 22 is in its alarm on or alarm off position. Severance of the cable 25 will sever the conductor 39 thereby disconnecting the relay coil 30a from the line-conductor-35-side of the battery 12. Severance of the cable 26 will sever the conductors 39, 42 likewise disconnecting the relay coil 30a from the line-conductor-35-side of the battery 12. When the relay coil 30a is de-energized, the relay contacts 30b, 30c close, connecting the line conductor 36 through the conductor 33 to the siren terminal 28b.

As an additional tamper precaution, a pair of tamper system conductors can also be incorporated in the cable 27 leading to the switches 23. In the manner of the conductors 39, 42 in the cable 26, these added conductors are connected in series power supply relationship with the relay coil 30a so that severance of the cable 27 will de-energize the relay 30 and sound the siren 28.

Referring to FIG. 2, the preferred key-operated switch is shown at 122. The switch 122 includes a U-shaped mounting bracket having upstanding legs 161, 162. A lock cylinder assembly 145 operated by key 146 is mounted on the leg 161. The cylinder assembly 145 has an annular mounting flange 163 and an adjacent threaded region 164. The threaded region 164 extends through a hole in the leg 161. A lock nut 165 is threaded onto the region 164. When the lock nut 165 is tightened against one side of the leg 161, the mounting flange 163 is drawn into engagement with the opposite side of the leg 161 to rigidly mount the cylinder 145 on the bracket 160.

A collar 170 is rotatably carried by the cylinder 145. The lock cylinder assembly 145 is arranged such that when the key 146 is inserted and turned, the collar 170 will rotate with the key 146.

The rotation of the collar is limited to a range of 180 degrees by coacting stops. A disc 171 is connected to the collar 170 for rotation with it. A pair of radially extending stop surfaces 172, 173 are formed on the disc 171. A projection 166 is formed integrally with the cylinder 145. A pair of stop surfaces 174, 175 are formed on the projection 166.

The position of the collar 170 shown in FIG. 2, when the stop surfaces 172, 174 are in engagement, will be referred to as the "zero-degree position". When the collar 170 is in the zero-degree position, the stop surfaces 173, 175 are on opposite sides of the collar 170. When the key 146 is turned 180° to bring the stop surfaces 173, 175 into engagement, the collar 170 then assumes a position which will be called the "180° position". When the collar 170 is in the 180° position, the stop surfaces 172, 174 are on opposite sides of the collar 170. The key 146 is removable from the lock cylinder assembly 145 when the collar 170 is in either the zero-degree or the 180° position.

A cylinder lock assembly of the described type is sold commercially by the Chicago Lock Company under the trademark ACE SWITCH LOCK No. EXA-112.

Three snap-action pushbutton switches 122a, 122b, 122c, are carried on the leg 162. A pair of threaded fasteners 178, 179 extend through aligned openings in the switches 122a, 122b, 122c and are threaded into holes formed in the leg 162. The pushbutton switches 122a, 122b, 122c are of conventional configuration and have pushbuttons 181 which, when depressed, close normally open contacts (not shown). Each of the switches, 122a, 122b, 122c carries a pair of terminals 182, 183 which are electrically connected when the associated switch button 181 is depressed.

The operation of the switch push buttons 181 is controlled by the cams 191, 192, 193. The cams 191, 192, 193 are mounted on a shaft 194. The shaft 194 extends through an opening (not shown) in the leg 162 and is received in the collar 170. A set screw 195 is threaded through a hole in the collar 170 and into engagement with the shaft to fix the shaft 194 to the collar 170.

The terminals 182 are all electrically connected to a conductor 136. The terminals 183 are each connected to a different one of the conductors 141, 142, 143. The conductors 136, 141, 142, 143 correspond to the conductors 36, 41, 42, 43 in FIG. 1.

The cams 191, 192, 193 have configurations which are arranged to effect a controlled sequential depression of the control buttons 181, as shown in the chart of FIG. 3. Cam 191 is operable to depress the control button 181 of switch 122a and thereby effect electrical connection between the conductors 136, 143 when the collar 170 is between the 45° position and the 180° position. The cam 192 is operable to depress the control button 181 of the switch 122b and thereby effect electrical connection between the conductors 136, 141 when the collar 170 is between the 80° position and the 125° position. The cam 193 is operable to depress the control button 181 of the switch 122c to effect electrical connection between the conductors 136, 142 when the collar 170 is between the 100° position and 145° position.

As will be apparent, the switch 122 can be substituted for the switch 22 simply by connecting the conductors 136, 141, 142, 143 respectively to the conductors 36, 41, 42, 43.

In rotating from the zero-degree position to the 180° position, the cams 191, 192, 193 will energize the conductors 43, 143 to arm or activate the vibration-sensitive switch 29, and will sequentially energize and de-energize the conductors 141, 142 to open and subsequently close the fuel cut-off valve 21. Since the conductor 141, 41 is de-energized prior to the energization of the conductor 142, 42 the last signal to be received by the solenoid valve 21 will be a closure signal from the conductor 142, 42. Hence, when the switch 122 reaches its 180° position, the vibration sensitive switch 29 will be activated and the fuel shut-off valve 21 will be closed.

When the cams 191, 192, 193 are rotated from their 180° position to their zero-degree position, the sequence of operation of the control buttons 181 is reversed. Since the conductor 142, 42 is de-energized prior to the de-energization of the conductor 141, 41, the last signal transmitted to the fuel shut-off valve 21 is a valve open signal transmitted on the conductor 142, 42. The valve 21 will remain open when the switch 122 reaches its zero-degree position.

The switch positions where contact is made between the conductor 136 and the conductors 141, 142 need not overlap as shown in FIG. 3. Instead, the switch 122 can operate in the manner of the switch 22 whereby contact between the conductor 136 and the conductors 141, 142 is not concurrent in any respect but rather occurs sequentially.

Although the invention has been described in its preferred form with a certain degree of particularity, it is understood that the present disclosure of the preferred form has been made only by way of example and numerous changes in the details of construction and the combination and arrangement of parts may be resorted to without departing from the spirit and the scope of the invention as hereinafter claimed.

What is claimed is:

1. An anti-tampering anti-theft protection system for a vehicle of the type having a body, a plurality of closures on the body, and an engine supplied with fuel through a fuel supply connected to a fuel tank, comprising in combination:
   a. a latching solenoid operated fuel cutoff valve interposed in the fuel supply for preventing the supply of fuel from the tank, said latching solenoid valve having at least three electrical terminals;
   b. one pair of the terminals being operable, when energized, to close said valve;
   c. another pair of the terminals being operable, when energized, to open said valve;
   d. alarm means including a motion sensitive switch electrically connected to an audible signal device, the motion sensitive switch being operative when the alarm means is enabled to energize the signal device in response to sensed vehicle movement;
   e. said alarm means further including a closure actuated switch electrically connected to said signal device and operative when said alarm means is enabled to energize said signal device in response to sensed opening of a body closure;
   f. electrical switch means electrically connected through first conductor means to said one pair of terminals and to said alarm means;
   g. the electrical switch means having an operator movable between alarm-on and alarm-off positions, said operator being operable upon movement from the alarm-off to the alarm-on positions to energize said one pair of terminals and to enable said alarm means;
   h. the electrical switch means being electrically connected through second conductor means to said another pair of terminals;
   i. the electrical switch means being operable upon movement of the operator from the alarm-off to the alarm-on positions to energize said another pair of terminals through the second conductor means prior to energizing said one pair of terminals through the first conductor means; and,
   j. the electrical switch means additionally being operable upon movement of the operator from the alarm-on to the alarm-off positions to energize said one pair of terminals through said first conductor means prior to energizing said another pair of terminals through said second conductor means.

2. The system of claim 1 wherein said switch means is operable upon movement of said operator from the alarm-off to the alarm-on positions to deenergize said another pair of terminals by terminating a supply of electrical current through said second conductor means prior to de-energizing said one pair of terminals by terminating a supply of electrical current through said first conductor means, and is operable upon movement of said operator from the alarm-on to the alarm-off positions to de-energize said one pair of terminals by terminating a supply of electrical current through said first conductor means prior to de-energizing said another pair of terminals by terminating a supply of electrical current through said second conductor means.

3. The system of claim 1 wherein said electrical switch means includes:
   a. first, second and third normally open pushbutton switches which are electrically connected to said first conductor means, said second conductor means, and said alarm means respectively;
   b. first, second and third cams for operating the pushbuttons of said first, second and third switches respectively;
   c. a key-operated lock assembly rotatably mounting said operator; and,
   d. a connection mechanically connecting said cams to said operator for rotation to operate said pushbuttons in response to rotation of said operator.

4. The system of claim 1, wherein:
   a. said alarm means additionally includes a relay switch, when energized, opens first and second relay contacts, and when de-energized closes said relay contacts;
   b. a multi-conductor electrical cable interconnects said solenoid operated valve and said alarm means;
   c. at least one of the conductors in said cable is electrically connected in series with said relay for energizing said relay to maintain said relay contacts open; and,
   d. said relay contacts are operative when closed due to severance of said cable to energize said signal device.

5. The system of claim 4 wherein:
   a. another multi-conductor cable interconnects said electrical switch means and said alarm means;
   b. at least one of the conductors in said another cable is electrically connected in series with said relay for energizing said relay to maintain said relay contacts open;
   c. whereby if either of said multi-conductor cables are severed, said relay contacts will close, energizing said signal device.

6. An anti-tampering anti-theft protection system for a vehicle of the type having an engine supplied with fuel through a fuel supply connected to a fuel tank, comprising in combination:
   a. a solenoid operated fuel cutoff valve of the latching type in the fuel supply for selectively preventing the supply of fuel from the fuel tank to the engine, said latching solenoid valve having at least three electrical terminals;
   b. one pair of the terminals being operable, when energized, to close said valve;
   c. another pair of the terminals operable, when energized, to open said valve;
   d. an electrically energizable audible alarm;
   e. a condition responsive switch adapted to close a pair of switch contacts in response to a sensed vehicle condition;
   f. a key operated electrical switch assembly including a lock, a key, and electrical switch structure operably connected to the lock;
   g. the key being insertable in and removable from the lock, the key being movable when inserted between alarm-on and alarm-off positions;
   h. the switch structure having an operator movable in response to movement of the inserted key between the alarm-on and alarm-off positions; and,
   i. the switch structure being electrically interconnected by conductor means to said fuel cutoff valve terminals, said alarm, and said condition responsive switch, such that:
      i. upon movement of the inserted key and the operator from the alarm-off to the alarm-on positions, the switch assembly both energizes said one pair of terminals to close said valve and enables said condition responsive switch to energize said alarm in response to a sensed vehicle condition; and,
      ii. upon movement of the inserted key and the operator from the alarm-on to the alarm-off positions, the switch assembly both energizes said another pair of terminals to open said valve and disable the condition responsive switch from energizing said alarm.

7. An anti-tampering anti-theft protection system for vehicles of the type having an engine supplied with fuel through a fuel supply line connected to a fuel tank, comprising in combination:
   a. a solenoid operated fuel cutoff valve of the latching type interposed in the fuel line for selectively cutting off the supply of fuel from the fuel tank to the engine, said latching solenoid valve having at least three electrical terminals one selected pair of which is operable, when momentarily energized, to close said valve, and an alternate selected pair of which is operable, when momentarily energized, to open said valve;
   b. an electrically energizable audible alarm;
   c. a vibration reponsive switch adapted to close a pair of switch contacts in response to sensed vibration of the vehicle and in response to sensed movement of the vehicle;
   d. a key operated electrical switch having an operator movable between alarm-on and alarm-off positions; and
   e. conductor means interconnecting said fuel cutoff valve, said alarm, said vibration responsive switch contacts, and said key operated switch such that:
      i. upon movement of said operator from said alarm-off to said alarm-on positions, said key operated switch both momentarily energizes said one pair of terminals to close said valve and enables said vibration responsive switch to energize said alarm in response to sensed vibration of the vehicle and in response to sensed movement of the vehicle;
      ii. upon movement of said operator from said alarm-on to said alarm-off positions, said key operated switch both energizes said alternate pair of terminals to open said valve and disables said vibration responsive switch from energizing said alarm; and
      iii. upon movement of said operator from the alarm-off to the alarm-on positions said electrical switch is operative to energize said alternate pair of terminals prior to energizing said one pair of terminals, and upon movement of said operator from the alarm-on to the alarm-off positions said electrical switch is operative to energize said one pair of terminals prior to energizing said alternate pair of terminals.

8. An anti-tampering anti-theft protection system for vehicles of the type having an engine supplied with fuel through a fuel supply line connected to a fuel tank, comprising in combination:
   a. a solenoid operated fuel cutoff valve of the latching type interposed in the fuel line for selectively cutting off the supply of fuel from the fuel tank to the engine, said latching solenoid valve having at least three electrical terminals one selected pair of which is operable, when momentarily energized, to close said valve, and an alternate selected pair of which is operable, when momentarily energized, to open said valve;
   b. an electrically energizable audible alarm;
   c. a vibration responsive switch adapted to close a pair of switch contacts in response to sensed vibration of the vehicle and in response to sensed movement of the vehicle;
   d. a key operated electrical switch having an operator movable between alarm-on and alarm-off positions; and,
   e. conductor means interconnecting said fuel cutoff valve, said alarm, said vibration responsive switch contacts, and said key operated switch such that:
      i. upon movement of said operator from said alarm-off to said alarm-on positions, said key operated switch both momentarily energizes said one pair of terminals to close said valve and enables said vibration responsive switch to energize said alarm in response to sensed vibration of the vehicle and in response to sensed movement of the vehicle;
      ii. upon movement of said operator from said alarm-on to said alarm-off positions, said key operated switch both energizes said alternate pair of terminals to open said valve and disables said vibration responsive switch from energizing said alarm;
      iii. upon movement of said operator from the alarm-off to the alarm-on positions said electrical switch is operative to energize said alternate pair of terminals prior to energizing said one pair of terminals, and upon movement of said operator from the alarm-on to the alarm-off positions said electrical switch is operative to energize said one pair of terminals prior to energizing said alternate pair of terminals; and iv. upon movement of said operator from the alarm-off to the alarm-on positions said electrical switch is operative to de-energize said alternate pair of terminals prior to de-energizing said one pair of terminals, and upon movement of said operator from the alarm-on to the alarm-off positions said electrical switch is operative to de-energize said one pair of terminals prior to de-energizing said alternate pair of terminals.

9. The system of claim 6 wherein said electrical switch structure includes:
  a. first, second and third normally open pushbutton switches respectively connected to one of said one pair of terminals, to one of said another pair of terminals, and to said vibration responsive switch respectively;
  b. first, second and third cams for operating the buttons of said first, second and third switches respectively; and,
  c. connection means connecting said cams to said operator for rotation therewith to operate said pushbuttons in response to rotation of said operator.

10. The anti-tampering anti-theft protection system of claim 6 wherein said conductor means includes at least one multi-conductor cable, and a tamper responsive means is provided for energizing said alarm in response to severance of said cable.

11. The anti-tampering anti-theft protection system of claim 6 wherein the vehicle additionally includes a body defining a plurality of compartments therein and having closures movable to selectively open and close said compartments, and wherein closure actuated switch means is electrically connected to said audible alarm and to said key operated switch for energizing said alarm in response to opening a selected one of said closures when said operator is in said alarm-on position.

* * * * *